United States Patent
Wong et al.

(10) Patent No.: US 9,767,718 B2
(45) Date of Patent: Sep. 19, 2017

(54) MANUFACTURING METHOD OF FILLING A RESIN INTO A HOUSING, AN LED DIGITAL DISPLAY AND THE METHOD OF MAKING THE SAME

(71) Applicants: LITE-ON OPTO TECHNOLOGY (CHANGZHOU) CO., LTD., Jiangsu Province (CN); LITE-ON TECHNOLOGY CORP., Taipei (TW)

(72) Inventors: Sung-Ming Wong, New Taipei (TW); Kuo-Yun Huang, Taoyuan (TW); Hsun-Jen Chang, Taipei (TW)

(73) Assignees: Lite-On Opto Technology (Changzhou) Co., Ltd., Jiangsu Province (CN); Lite-On Technology Corp., Taipei (TW)

(*) Notice: Subject to any disclaimer, the term of this patent is extended or adjusted under 35 U.S.C. 154(b) by 56 days.

(21) Appl. No.: 15/059,796

(22) Filed: Mar. 3, 2016

(65) Prior Publication Data

US 2017/0004745 A1    Jan. 5, 2017

(30) Foreign Application Priority Data

Jun. 30, 2015 (CN) .......................... 2015 1 0388014

(51) Int. Cl.
| | | |
|---|---|---|
| *G09F 9/00* | (2006.01) | |
| *G09F 9/33* | (2006.01) | |
| *G09F 9/302* | (2006.01) | |
| *H01L 27/15* | (2006.01) | |
| *B29D 11/00* | (2006.01) | |
| *H01L 21/00* | (2006.01) | |
| *A23G 1/22* | (2006.01) | |
| *B29C 39/02* | (2006.01) | |
| *B29C 39/10* | (2006.01) | |

(52) U.S. Cl.
CPC .............. *G09F 9/33* (2013.01); *G09F 9/3023* (2013.01); *B29C 39/021* (2013.01); *B29C 39/10* (2013.01)

(58) Field of Classification Search
CPC ....... G09F 9/33; G09F 9/3023; B29C 39/021; B29C 39/10; B29C 45/14
USPC .................................................... 340/815.44
See application file for complete search history.

(56) References Cited

U.S. PATENT DOCUMENTS

| | | | | |
|---|---|---|---|---|
| 6,066,861 | A * | 5/2000 | Hohn ................. | C09K 11/7718 252/301.36 |
| 6,069,440 | A * | 5/2000 | Shimizu ............. | C09K 11/7767 313/486 |
| 6,139,304 | A * | 10/2000 | Centofante ....... | B29C 45/14311 257/E21.504 |
| 6,159,770 | A * | 12/2000 | Tetaka ................ | H01L 21/4832 257/E21.504 |

(Continued)

*Primary Examiner* — Jack K Wang
(74) *Attorney, Agent, or Firm* — Rosenberg, Klein & Lee

(57) ABSTRACT

A manufacturing method of filling a resin into a housing includes the steps of: providing a housing that has at least one recess, with the recess having first and second spaces, and the first space being disposed above the second space; inverting the housing; injecting a fluid into the recess to fill the first space, with the fluid having a viscosity coefficient and a surface tension less than those of water; and injecting a first resin into the recess, with the first resin having a specific gravity greater than that of the fluid, such that the first resin fills the first space and the fluid fills the second space.

14 Claims, 11 Drawing Sheets

(56) References Cited

U.S. PATENT DOCUMENTS

| | | | | |
|---|---|---|---|---|
| 7,915,085 B2* | 3/2011 | Leung | .................... | H01L 21/565 |
| | | | | 438/107 |
| 2001/0000622 A1* | 5/2001 | Reeh | .................. | C09K 11/7718 |
| | | | | 257/98 |
| 2001/0007484 A1* | 7/2001 | Sakamaki | .......... | G11B 23/0302 |
| | | | | 349/2 |
| 2002/0024299 A1* | 2/2002 | Okazaki | ................ | H01L 25/167 |
| | | | | 313/512 |
| 2002/0027265 A1* | 3/2002 | Yoneda | ............... | H01L 21/4832 |
| | | | | 257/666 |
| 2004/0061433 A1* | 4/2004 | Izuno | ................ | H01L 21/76251 |
| | | | | 313/498 |
| 2004/0104391 A1* | 6/2004 | Maeda | ................... | C09K 11/025 |
| | | | | 257/79 |
| 2005/0072981 A1* | 4/2005 | Suenaga | ............... | H01L 33/486 |
| | | | | 257/88 |
| 2005/0167682 A1* | 8/2005 | Fukasawa | ............... | H01L 33/60 |
| | | | | 257/79 |
| 2005/0269592 A1* | 12/2005 | Lee | ...................... | C09K 11/778 |
| | | | | 257/100 |
| 2006/0118510 A1* | 6/2006 | Fujii | ..................... | H01L 33/505 |
| | | | | 216/24 |
| 2006/0157721 A1* | 7/2006 | Tran | .................... | H01L 33/0079 |
| | | | | 257/98 |
| 2008/0024317 A1* | 1/2008 | Chen | ....................... | G09F 9/375 |
| | | | | 340/815.44 |
| 2015/0219846 A1* | 8/2015 | Kontani | .................... | G02B 6/10 |
| | | | | 427/163.2 |
| 2016/0336261 A1* | 11/2016 | Furutani | .......... | H01L 23/49833 |
| 2016/0354591 A1* | 12/2016 | Ueno | ................ | A61M 37/0015 |
| 2017/0004745 A1* | 1/2017 | Wong | ........................ | G09F 9/33 |

* cited by examiner

MANUFACTURING METHOD OF FILLING A RESIN INTO A HOUSING, AN LED DIGITAL DISPLAY AND THE METHOD OF MAKING THE SAME

CROSS-REFERENCE TO RELATED APPLICATION

This application claims priority of Chinese Application No. 201510388014.X, filed on Jun. 60, 2015.

FIELD

The disclosure relates to a manufacturing method, more particularly to a manufacturing method of filling a resin into a housing, an LED digital display and the method of making the same.

BACKGROUND

The conventional method of filling a resin into a reflector housing for making an LED digital display has problems in evacuating air completely from corners of the reflector housing due to factors such as the shape of the reflector housing. As a consequence, air bubbles are formed and trapped in the resin in the reflector housing. Therefore, after injection of the resin, the reflector housing is required to be placed into a vacuum chamber to remove the air bubbles from the resin.

However, the air bubbles often burst when they reach the top surface of the resin (such as epoxy resin) during the vacuuming operation, which results in overflow of the resin from the reflector housing. The overflow of the resin adheres to the outer surface of the reflector housing, and is required to be removed (cleaned) manually. In addition, re-examination of whether there are any air bubbles remaining in the resin and further removal of the remaining air bubbles from the resin may be needed to ensure that the resin is free of the air bubbles. In other words, having air bubbles trapped in the resin complicates the conventional method in that an additional procedure is required to solve this problem. Therefore, there is a need for a method that can prevent air bubbles from being formed in the resin.

SUMMARY

Therefore, an object of the disclosure is to provide a manufacturing method of filling a resin into a housing that can alleviate the drawback of the prior art.

Another object of the disclosure is to provide a method of manufacturing an LED digital display that can alleviate the drawback of the prior art and that is relatively simplified.

Yet another object of the disclosure is to provide an LED digital display manufactured by the aforesaid method.

The effect of the disclosure lies in that a fluid is injected into a recess prior to injection of a first resin into the recess to permit the fluid to rapidly spread and flow in the recess due to the fact that the fluid has a viscosity coefficient and a surface tension less than those of water so as to evacuate air bubbles close to a surrounding surface of the recess. As such, generation of air bubbles in the first resin may be prevented during injection of the first resin into the recess. Therefore, it is not necessary to place the housing containing the first resin into a vacuum chamber to remove the air bubbles from the first resin. The effect of preventing the generation of air bubbles and simplifying the conventional manufacturing method may be achieved thereby.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
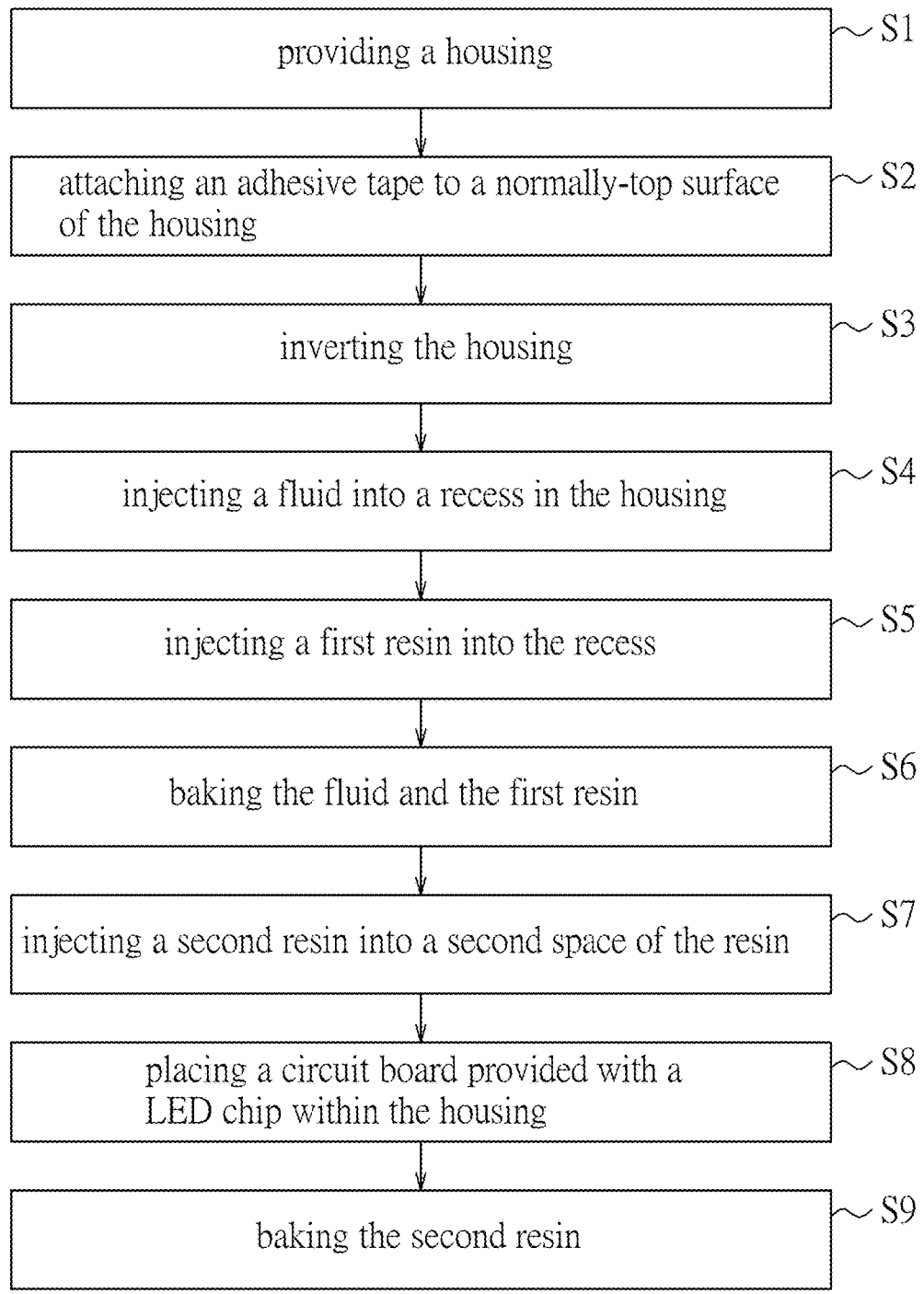
FIG. 1 is a flow diagram illustrating an embodiment of a method of manufacturing an LED digital display according to the disclosure.
Figure 2:
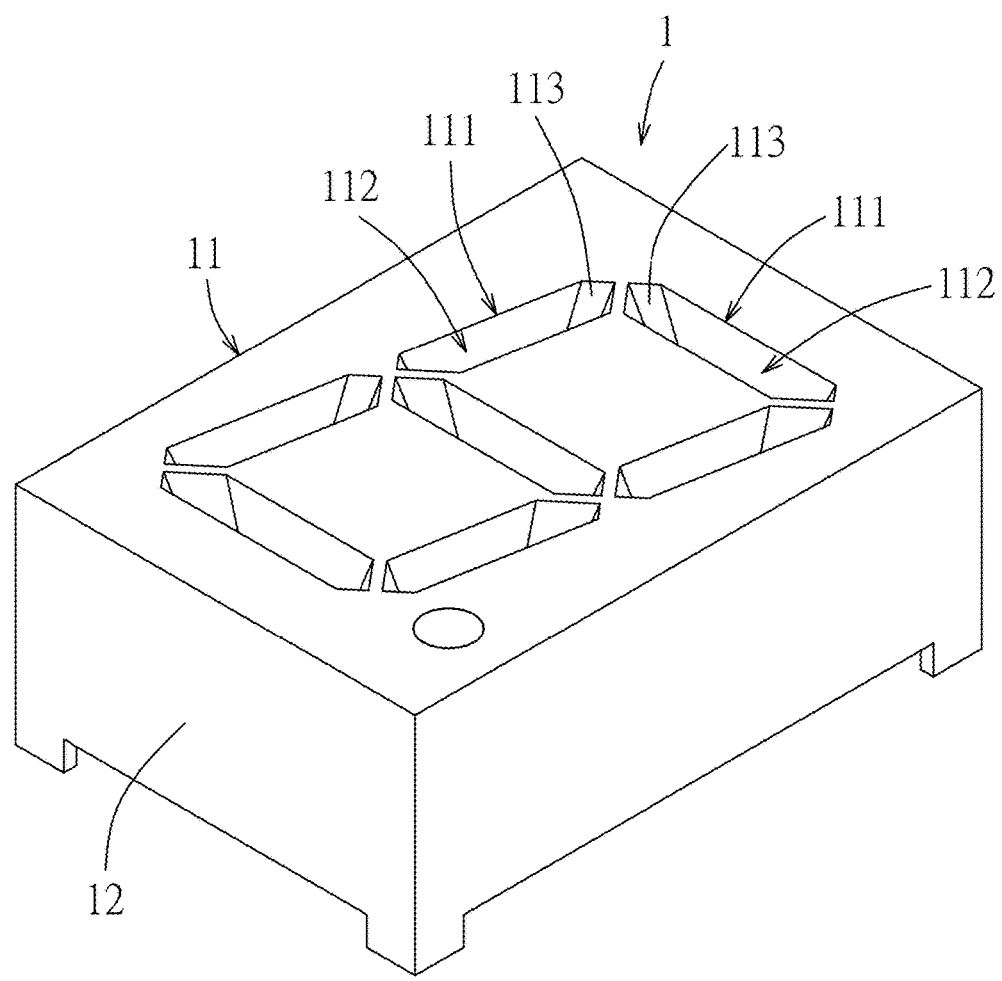
FIGS. 2 to 4 are perspective views illustrating a configuration of a housing for an embodiment of an LED digital display according to the disclosure.
Figure 3:
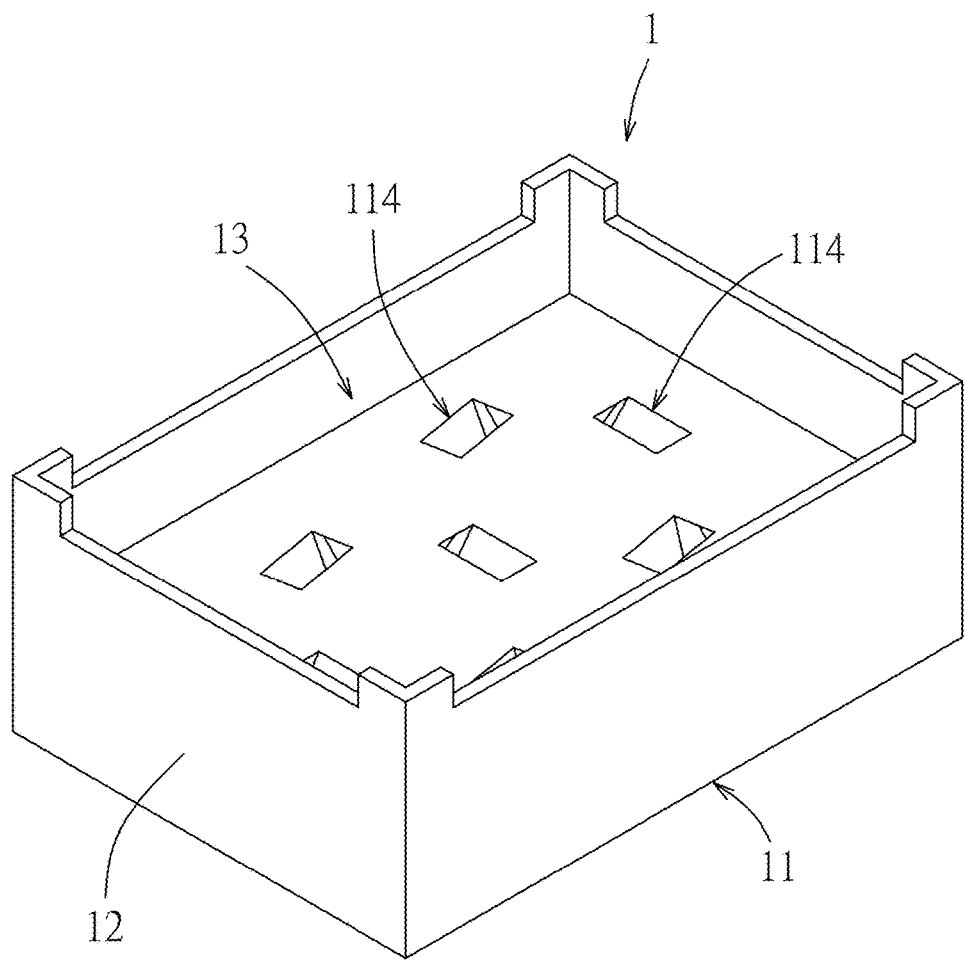
Figure 4:
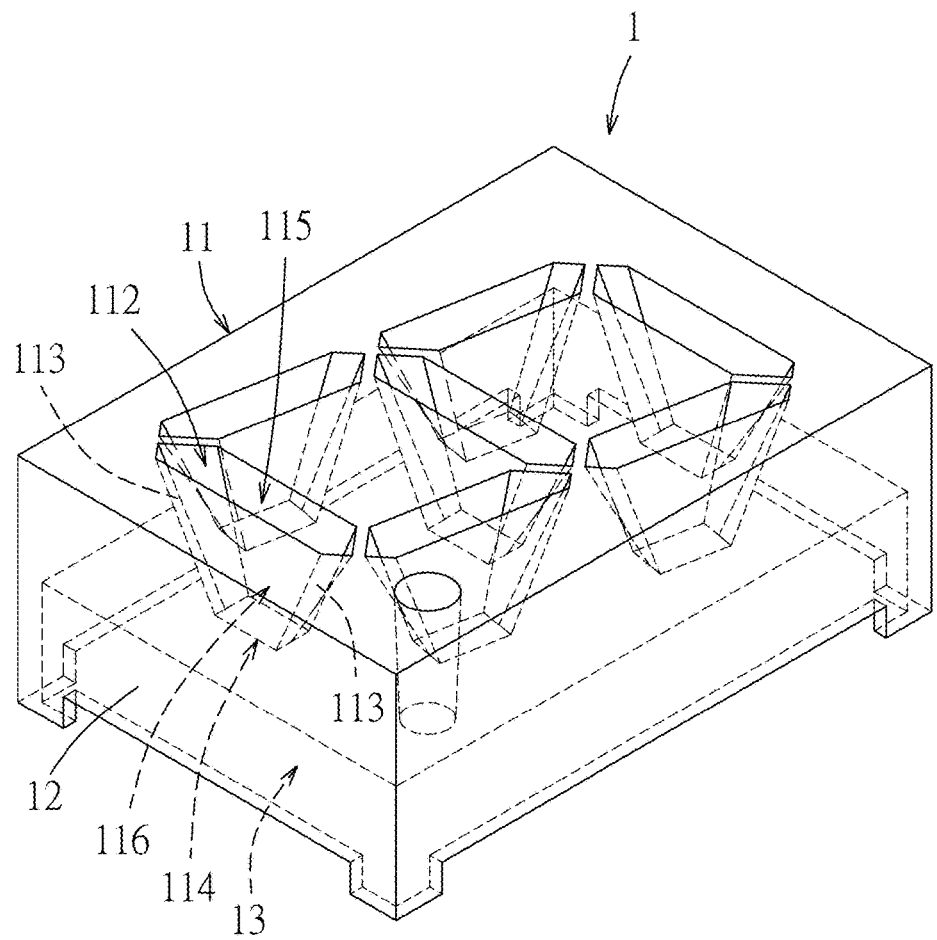

Before the disclosure is described in greater detail with reference to the accompanying embodiments, it should be noted herein that like elements are denoted by the same reference numerals throughout the disclosure.

Referring to FIG. 1, an embodiment of a method of manufacturing an LED digital display comprises the following steps S1-S9.

Figure 5:
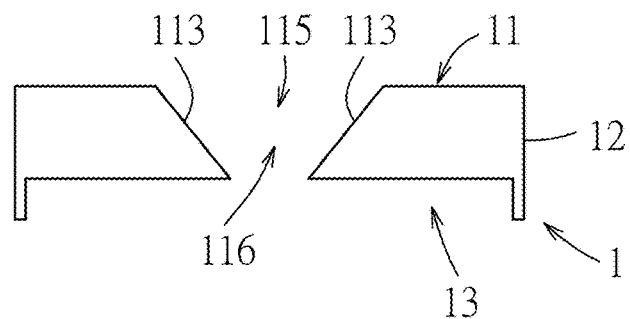
FIGS. 5 to 13 are schematic views illustrating the steps of the embodiment of the method of manufacturing an LED digital display according to the disclosure.

In Step S1, referring to FIGS. 2 to 5, a housing 1 which is a reflector of a digital displayer is provided. The housing 1 includes a normally-top surface 11, a surrounding wall 12 extending downwardly from the normally-top surface 11, and a surrounding surface 113. The normally-top surface 11 is formed with at least one first opening 111. When the housing 1 is used as a reflector of a 7-segment digital displayer, the normally-top surface 11 has seven first openings 111. The surrounding surface 113 extends downwardly from a periphery of the first opening 111, and defines a recess 112. The recess 112 has first and second spaces 115, 116. The first space 115 is disposed above the second space 116 and adjacent to the normally-top surface 11. The surrounding surface 113 defines a second opening 114 that is opposite to the first opening 111. The surrounding surface 113 has one end adjacent to the normally-top surface 11, and the other end adjacent to the second opening 114. The normally-top surface 11 and the surrounding wall 12 cooperatively define a receiving space 13. In this embodiment, the surrounding surface 113 and the normally-top surface 11 cooperatively define an angle therebetween that is an obtuse angle (as shown in FIG. 5). Alternatively, the angle may be a right angle, such that the surrounding wall 12 is parallel to the surrounding surface 113.

Figure 6:
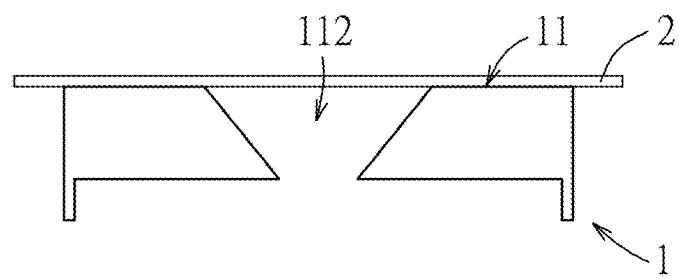

In Step S2, referring to FIG. 6, an adhesive tape 2 is adhered to the normally-top surface 11 of the housing 1 to seal the first opening 111. In this embodiment, the adhesive tape 2 is sealingly bonded to a top periphery of the recess 112 to seal the first opening 111.

Figure 7:
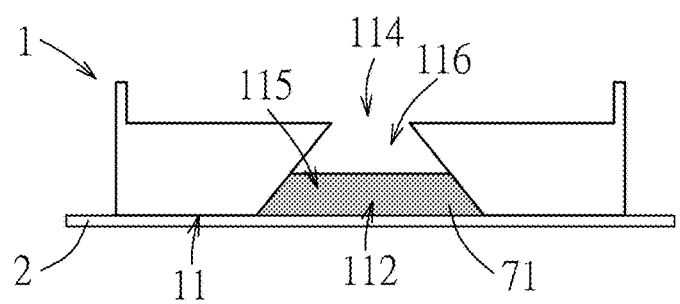

In Step S3, referring to FIG. 7, the housing 1 is inverted so that the normally-top surface 11 of the housing 1 and the adhesive tape 2 face downwardly and the second space 116 is disposed above the first space 115.

In Step S4, referring to FIG. 7, a fluid 71 is injected into the recess 112 to fill the first space 115. The fluid 71 has a viscosity coefficient and a surface tension less than those of water. The fluid 71 is a liquid having low surface tension characteristic. In terms of physical definition, the surface tension is defined as a normal force per unit length at a contact edge of a liquid in contact with a solid surface (i.e., surface tension (T)=normal force (F)/contact length (L)). In terms of energy, the surface tension is defined as a potential energy per unit area at the surface of the liquid (i.e., surface tension (T)=work done by cohesive force ($\Delta w$)/an increased area ($\Delta A$) (J/m2)). The fluid 71 used in the disclosure has a surface tension ranging from 0.0023 N/m to 0.077 N/m. Examples of the fluid 71 include, but are not limited to, isopropyl acetone and ethanol. In this embodiment, the fluid 71 is isopropyl acetone. Since the fluid 71 can rapidly spread and flow in the bottom of the recess 112, any air bubbles that may be formed in the fluid 71 (in which some of the air bubbles may be dispersed in the fluid 71 and others may be close to the surrounding surface 113 and the adhesive tape 2), can be quickly self-evacuated from the fluid 71.

Figure 8:
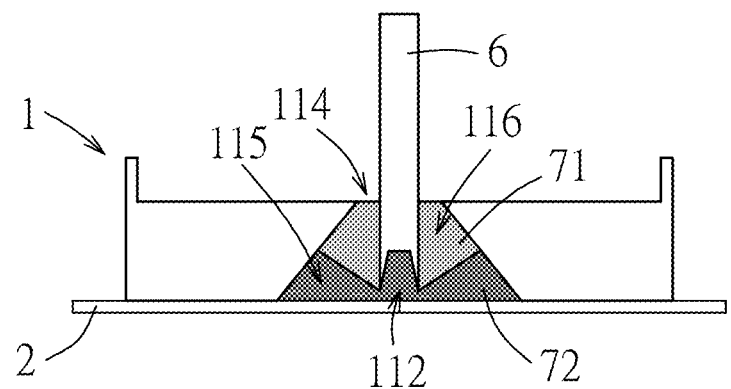
Figure 9:
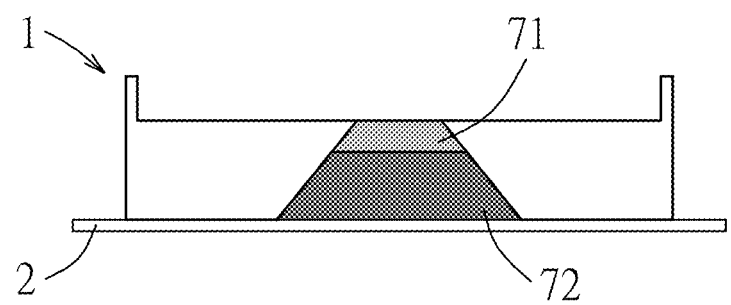

In Step S5, referring to FIG. 8, a first resin 72 is injected into the recess 112 to contact the fluid 71. The first resin 72 has a specific gravity greater than that of the fluid 71 so as to permit the first resin 72 to sink beneath the fluid 71 and to exchange position with the fluid 71 so that the first resin 72 fills the first space 115 and the fluid 71 fills the second space 116. A non-limiting example of the first resin 72 usable in this embodiment is an epoxy resin. The injection of the first resin 72 into the recess 112 may be conducted by inserting a perfusion needle 6 through the second opening 114 into the recess 112 at a position close to the adhesive tape 2. The injection operation continues until the first resin 72 together with the fluid 71 substantially fills the entire space of the recess 112. Since the first resin 72 has a specific gravity greater than that of the fluid 71 and since the first resin 72 has a low solubility with the fluid 71, the first resin 72 and the fluid 71 can be easily separated into different layers as shown in FIG. 9 after the completion of the injection. The first resin 72 may have a relatively low solubility with the fluid 71 at an interface between the first resin 72 and the fluid 71. The air bubbles that may be generated in the first resin 72 can be easily evacuated through the exchange of the first resin 72 and the fluid 71 in position during the injection. It is noted that the injection of the first resin 72 into the recess 112 using the perfusion needle 6 which is disposed at a position close to the adhesive tape 2 can further reduce the generation of the air bubbles.

Figure 10:
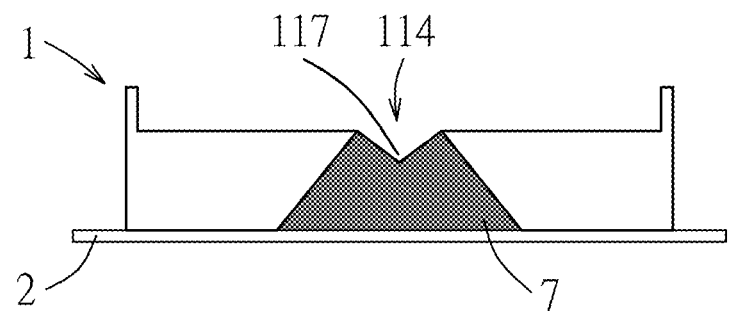

In Step S6, referring to FIG. 10, the fluid 71 and the first resin 72 in the recess 112 are baked so as to form a first resin layer 7 after the step of injecting the first resin 72 into the recess 112. Since the fluid 71 employed in the method is a high volatile liquid, the same can easily be vaporized and escape from the second opening 114 during baking. A small groove 117 may be formed in the first resin layer 7 in the second space 116 of the recess 112 after the baking. In certain embodiments, the first resin layer 7 thus formed may contain the first resin 72 and a residual of the fluid 71 that may be uniformly mixed with the first resin 72.

Figure 11:
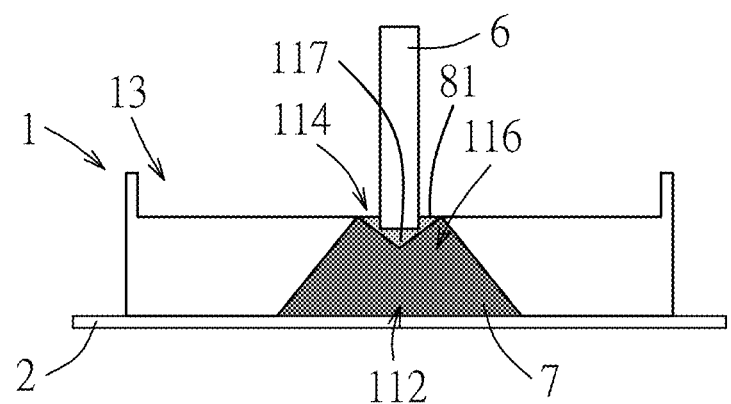
Figure 12:
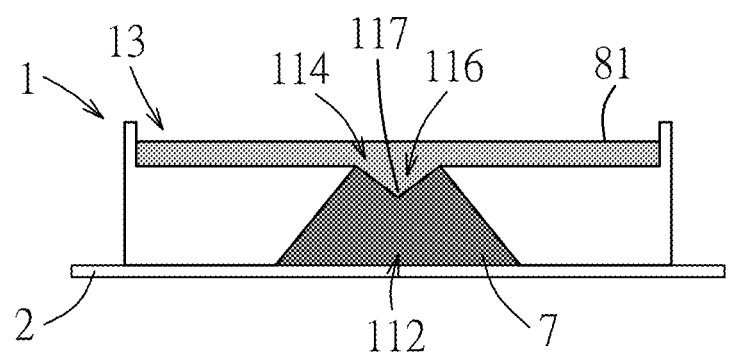

In Step S7, referring to FIG. 11, a second resin 81 is injected into the groove 117 of the second space 116 to fill the groove 117. The injection of the second resin 81 is conducted by inserting a perfusion needle 6 through the second opening 114 into the groove 117 of the second space 116. As shown in FIG. 12, the method of the disclosure may further comprise injecting the second resin 81 into the receiving space 13 of the housing 1. The second resin 81 overflows from the second opening 114 to fill the receiving space 13 of the housing 1.

Figure 13:
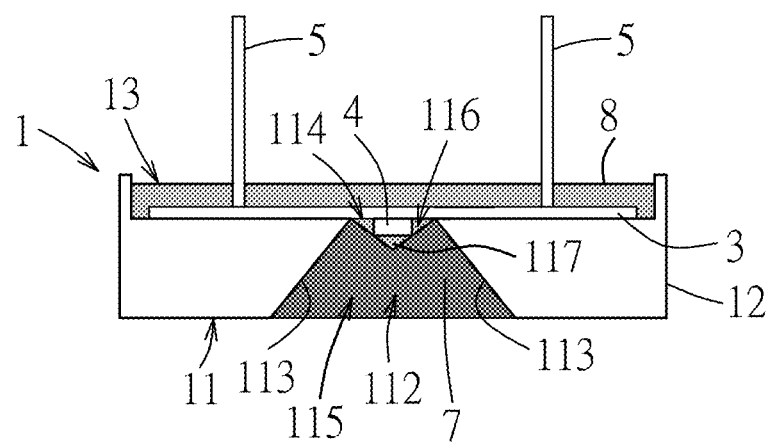

In Step S8, referring to FIG. 13, a circuit board 3 provided with an LED chip 4 at one side thereof is placed within the housing 1, such that the LED chip 4 is disposed in the groove within the recess 112 and is encapsulated by the second resin 81. The circuit board 3 is provided with a plurality of conductive pins 5 at the other side thereof. The LED chip 4 is disposed adjacent to the second opening 114. The conductive pins 5 extend in a direction away from the circuit board 3.

In Step S9, referring back to FIGS. 12 and 13, the second resin 81 is baked to form into a second resin layer 8, followed by removing the adhesive tape 2 to complete the manufacture of the LED digital display.

Figure 14:
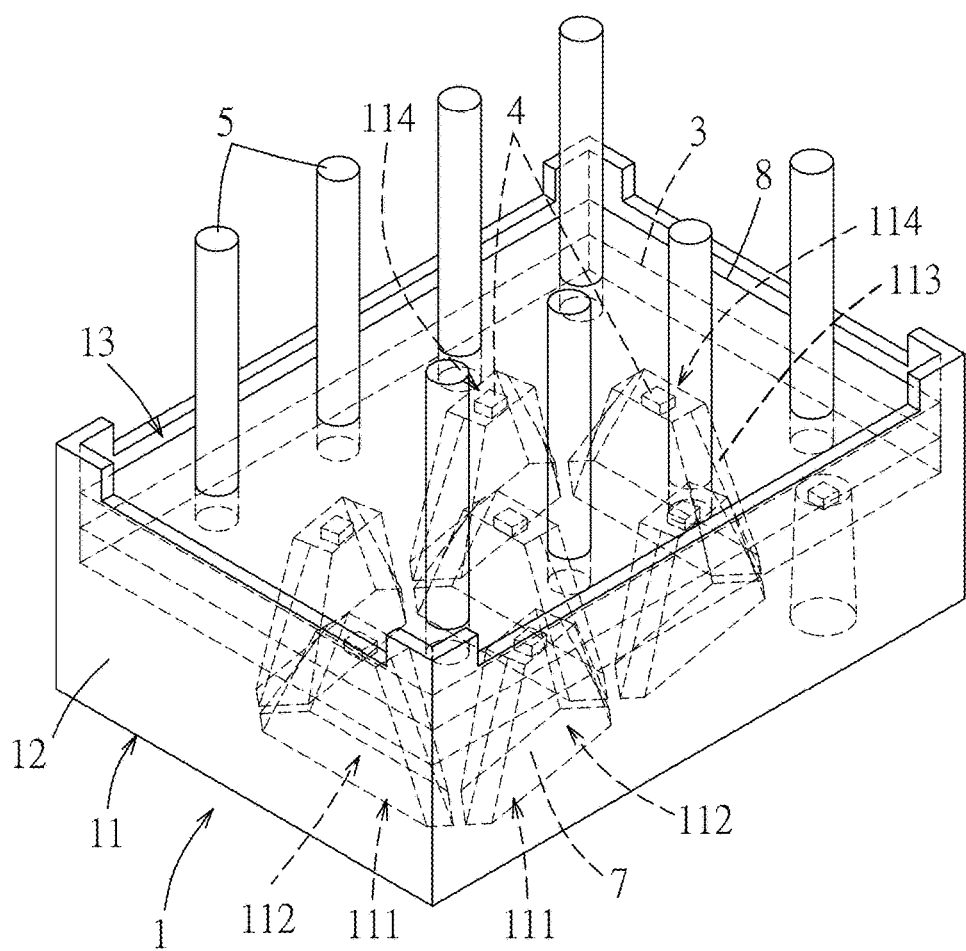
FIG. 14 is a perspective view illustrating an embodiment of an LED digital display according to the disclosure.
Figure 15:
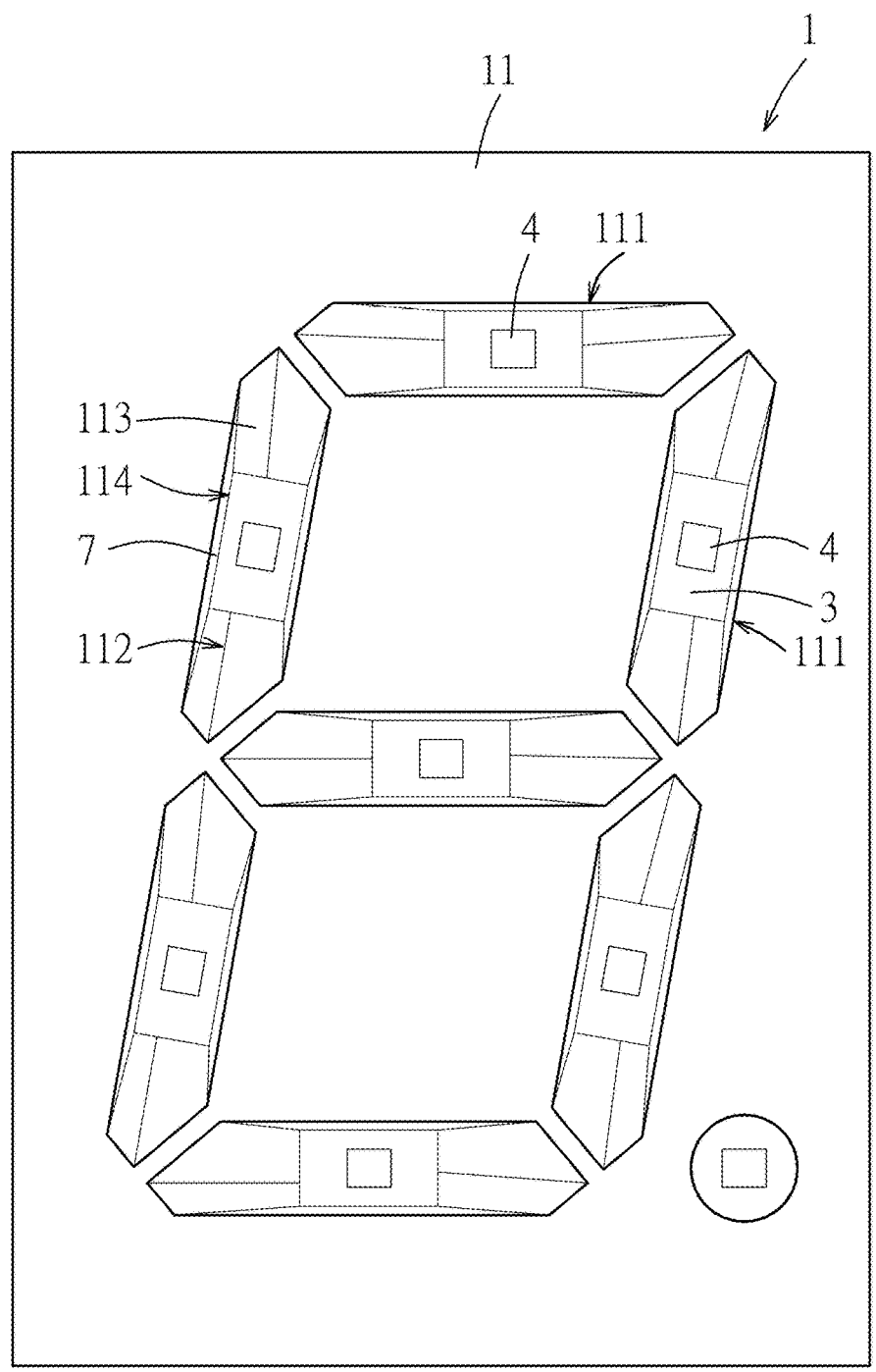
FIG. 15 is a bottom view of the embodiment of the LED digital display in FIG. 14 to illustrate an arrangement of a plurality of recesses in the housing of the LED digital display.

Referring to FIGS. 13 to 15, an embodiment of the LED digital display made from the method of the disclosure may include a housing 1, a first resin layer 7, a second resin layer 8, a circuit board 3, at least one LED chip 4, and a plurality of conductive pins 5. The housing 1 has a normally-top surface 11 that is formed with at least one opening 111. In this embodiment, the housing is used as a reflector of a 7-segment digital display so that the normally-top surface 11 has seven openings 111. The housing 1 further has seven surrounding surfaces 113, each extending downwardly from a periphery of a corresponding opening 111. Each surrounding surface 113 defines at least one recess 112. The recess 112 includes first and second spaces 115, 116. The first space 115 is disposed above the second space 116 and adjacent to the normally-top surface 11. In this embodiment, the openings 111, the surrounding surfaces 113, or the recesses 112, which are seven in number, are arranged in a shape of "8" as shown in FIG. 15. The housing 1 is formed with seven second openings 114, each of which is disposed opposite to a corresponding one of the openings 111. The normally-top surface 11 and the surrounding wall 12 cooperatively define a receiving space 13. FIGS. 13 and 14 show an inverted configuration of the LED digital display.

The first resin layer 7 is disposed in the first space 115, and contains the first resin 72 and the fluid 71. The second resin layer 8 contains a second resin 81 that is disposed in the second space 116 and that fills the groove of the second space 116 to enclose the LED chip 4. The circuit board 3 disposed in the housing 1 covers the second opening 114 and is embedded in the second resin layer 8. The LED chip 4 is mounted on one side of the circuit board 3, and is disposed adjacent to the second opening 114. The conductive pins 5 extend from the other side of the circuit board 3 in a direction away from the circuit board 3. In this embodiment, the number of the conductive pins 5 is eight. Alternatively, the number of the conductive pins 5 may vary according to actual requirements.

It is noted that, the aforesaid steps S1 to S9 of the method constitutes one cycle to make one segment of the LED digital display that has one recess 112 to be filled with the first and second resins for forming the first and second resin layers. The number of the cycles may vary correspondingly according to the number of the segments of the LED digital display or the number of the recesses 112 to be filled with the first and second resins.

Figure 16:
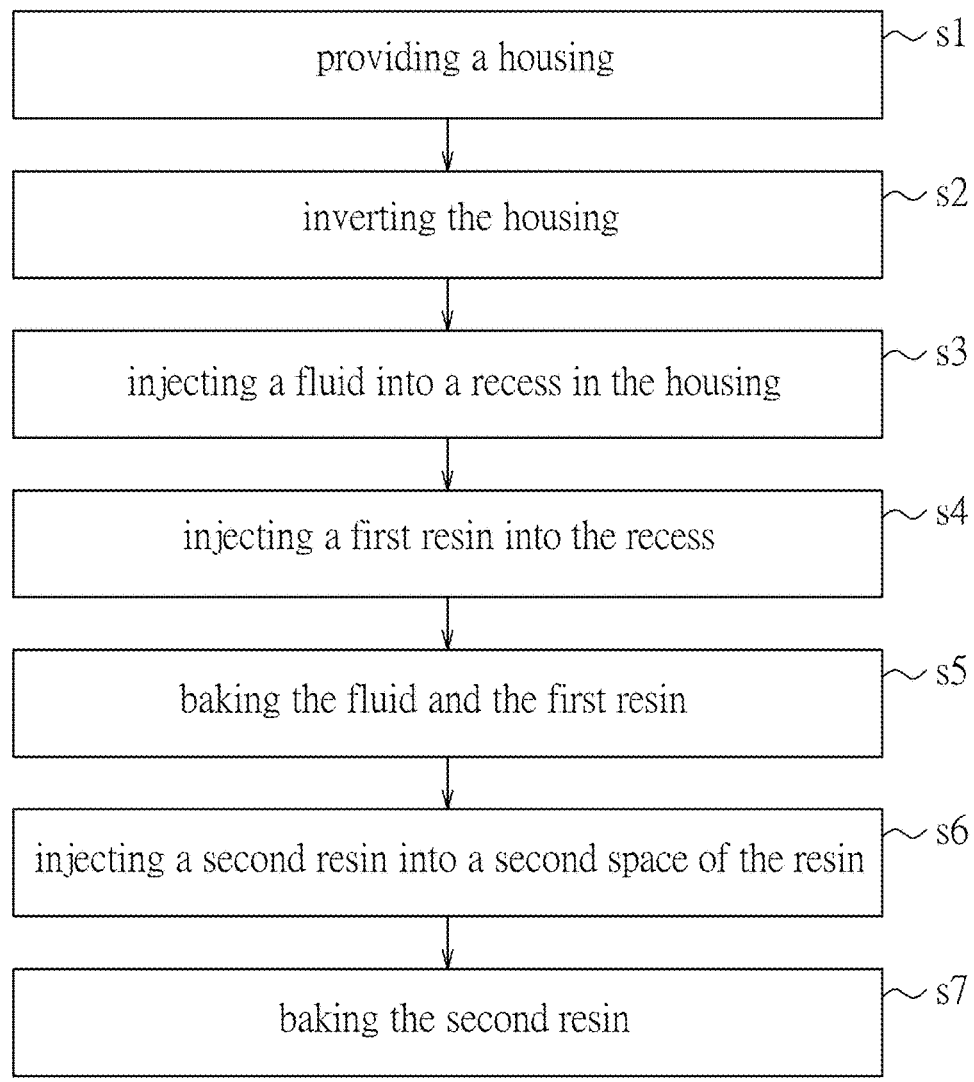
FIG. 16 is a flow diagram illustrating an embodiment of a manufacturing method of filling a resin into a housing according to the disclosure.

FIG. 16 illustrates consecutive steps s1 to s7 of a manufacturing method for making articles other than the LED digital display. Steps s1 to s7 involve actions for filling a resin into a housing, and correspond respectively to steps S1, S3 to S7 and S9 of the manufacturing method shown in FIG. 1. The housing (not shown) used in steps s1 to s7 of the method only needs a recess with an end opening facing upwardly for injecting of the fluid and the resin therein. The type of the housing is not limited to a reflector of an LED digital display.

Steps s2 to s6 of the manufacturing method of filling a resin into a housing are similar to the aforementioned steps S3 to S7, which involve actions of injecting the fluid and the first and second resins into the housing. The fluid (such as isopropyl acetone or ethanol) having a viscosity coefficient and a surface tension less than those of water is injected into the housing before injecting successively the first and second resins into the housing for preventing generation of the air bubbles. The manufacturing method may be used in processes that involve filling a resin into a housing, and are not limited to the process of making an LED digital display.

In view of the forgoing, by injecting the fluid 71 into the recess 112 prior to the injection of the first resin 72, the fluid 71 having a viscosity coefficient and a surface tension less than those of water can spread and flow quickly in the recess 112 so as to exclude or evacuate the air bubbles close to the surfaces of the recess 112, the surrounding surface 113, and the adhesive tape 2 from the recess 112. As such, generation of air bubbles in the resin may be prevented during injection of the first resin 72 in the recess 112, thereby permitting elimination of the vacuuming step required in the prior art method and preventing burst of the air bubbles in the resin that requires subsequent cleaning in the prior art method.

While the present disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A manufacturing method of filling a resin into a housing, comprising the steps of:
    providing a housing that has a normally-top surface and at least one recess that is indented inwardly from the normally-top surface, the recess having a first space and a second space, the first space being disposed above the second space, the first space being disposed adjacent to the normally-top surface;
    inverting the housing so that the normally-top surface of the housing faces downwardly and the second space is disposed above the first space;
    injecting a fluid into the recess to fill the first space, the fluid having a viscosity coefficient and a surface tension less than those of water; and
    injecting a first resin into the recess to contact the fluid, the first resin having a specific gravity greater than that of the fluid so as to permit the first resin to sink beneath the fluid and to exchange position with the fluid, such that the first resin fills the first space and the fluid fills the second space.

2. The method of claim 1, further comprising a step of baking the fluid and the first resin so as to form a first resin layer after the step of injecting the first resin into the recess.

3. The method of claim 2, further comprising a step of injecting a second resin into the second space to fill the second space after the step of baking the fluid and the first resin.

4. The method of claim 3, further comprising a step of baking the second resin to form a second resin layer after the step of injecting the second resin into the second space.

5. The method of claim 1, wherein the fluid is a liquid having a low surface tension, the liquid being selected from the group consisting of isopropyl acetone, ethanol, and the combination thereof.

6. A method of manufacturing an LED digital display, comprising the steps of:
    providing a housing that includes a normally-top surface and a surrounding surface, the normally-top surface being formed with at least one first opening, the surrounding surface extending downwardly from a periphery of the first opening and defining a recess, the recess having a first space and a second space, the first space being disposed above the second space, the first space being disposed adjacent to the normally-top surface;
    attaching an adhesive tape to the normally-top surface of the housing to seal the first opening;
    inverting the housing so that the normally-top surface of the housing and the adhesive tape face downwardly and the second space is disposed above the first space;
    injecting a fluid into the recess to fill the first space, the fluid having a viscosity coefficient and a surface tension less than those of water;
    injecting a first resin into the recess to contact the fluid, the first resin having a specific gravity greater than that of the fluid so as to permit the first resin to sink beneath the fluid and to exchange position with the fluid so that the first resin fills the first space and the fluid fills the second space;
    baking the fluid and the first resin so as to form a first resin layer;
    injecting a second resin into the second space;
    placing a circuit board provided with a LED chip within the housing, the LED chip being disposed in the recess in such a manner that the LED chip is encapsulated by the second resin; and
    baking the second resin so as to form a second resin layer.

7. The method of claim 6, wherein the recess has a second opening opposite to the first opening, the injection of the first resin into the recess being conducted by inserting a perfusion needle through the second opening into the recess at a position close to the adhesive tape.

8. The method of claim 6, wherein the fluid is a liquid having a low surface tension, the liquid being selected from the group consisting of isopropyl acetone, ethanol, and the combination thereof.

9. An LED digital display comprising:
    a circuit board;
    an LED chip provided on said circuit board;
    a housing having a normally-top surface and a surrounding surface, said normally-top surface being formed with at least one first opening, said surrounding surface extending downwardly from a periphery of said first opening and defining a recess, said recess having a first space and a second space, said first space being disposed above said second space, said first space being disposed adjacent to said normally-top surface;
    a first resin layer containing a first resin and a fluid and disposed in said first space; and
    a second resin layer containing a second resin and filling said second space so as to encapsulate said LED chip.

10. The LED digital display of claim 9, wherein at least one of said first and second resins is made from a material comprising epoxy resin, said fluid comprising isopropyl acetone or ethanol.

11. The LED digital display of claim 9, wherein said housing is a reflector of a 7-segment digital display, and said normally-top surface has seven first openings, said housing further has seven surrounding surfaces, each extending downwardly from a periphery of a corresponding one of said seven first openings.

12. The LED digital display of claim 9, wherein said surrounding surface defines a second opening opposite to said first opening, said circuit board being disposed in the housing, covering said second opening, and being embedded in said second resin layer.

13. The LED digital display of claim 12, wherein said LED chip is mounted on one side of said circuit board and is disposed adjacent to said second opening, said circuit board being provided with at least one conductive pin extending from the other side of said circuit board in a direction away from said circuit board.

14. The LED digital display of claim 9, wherein said fluid has a surface tension ranging from 0.0023 N/m to 0.077 N/m.

\* \* \* \* \*